US00RE39570E

(19) United States
(12) Reissued Patent
Perella et al.

(10) Patent Number: US RE39,570 E
(45) Date of Reissued Patent: Apr. 17, 2007

(54) FAN GRILL CONSTRUCTION

(75) Inventors: James B. Perella, West Chester, PA (US); Barry Shapiro, Doylestown, PA (US)

(73) Assignee: Lasko Holdings, Inc., Wilmington, DE (US)

(21) Appl. No.: 10/888,969

(22) Filed: Jul. 9, 2004

Related U.S. Patent Documents

Reissue of:
(64) Patent No.: 6,454,537
Issued: Sep. 24, 2002
Appl. No.: 09/828,673
Filed: Apr. 9, 2001

(51) Int. Cl.
*F04D 29/54* (2006.01)

(52) U.S. Cl. ..... 416/247 R

(58) Field of Classification Search ..... 416/247 R, 416/189, 62; 415/211.2, 227, 228
See application file for complete search history.

(56) References Cited

U.S. PATENT DOCUMENTS

| | | | | | |
|---|---|---|---|---|---|
| 2,554,602 | A | * | 5/1951 | Sutton | 415/222 |
| 6,015,262 | A | * | 1/2000 | Huang | 416/247 R |
| 6,015,265 | A | * | 1/2000 | Lasko et al. | 416/247 R |
| 6,071,079 | A | * | 6/2000 | Litvin | 416/247 R |
| D427,674 | S | * | 7/2000 | Moreno | D23/412 |
| 6,213,718 | B1 | * | 4/2001 | Hill et al. | 416/247 R |
| 6,309,192 | B1 | * | 10/2001 | Litvin | 415/213.1 |
| 6,364,618 | B1 | * | 4/2002 | Moreno | 416/247 R |

* cited by examiner

*Primary Examiner*—Richard A. Edgar
(74) *Attorney, Agent, or Firm*—Woodcock Washburn LLP

(57) ABSTRACT

Improved fan grill/guard construction for fans for supplying air, where the fan has a front grill with an outer ring which wraps around and is dimensionally structured to improve airflow and to diffuse the air over a wide area.

54 Claims, 5 Drawing Sheets

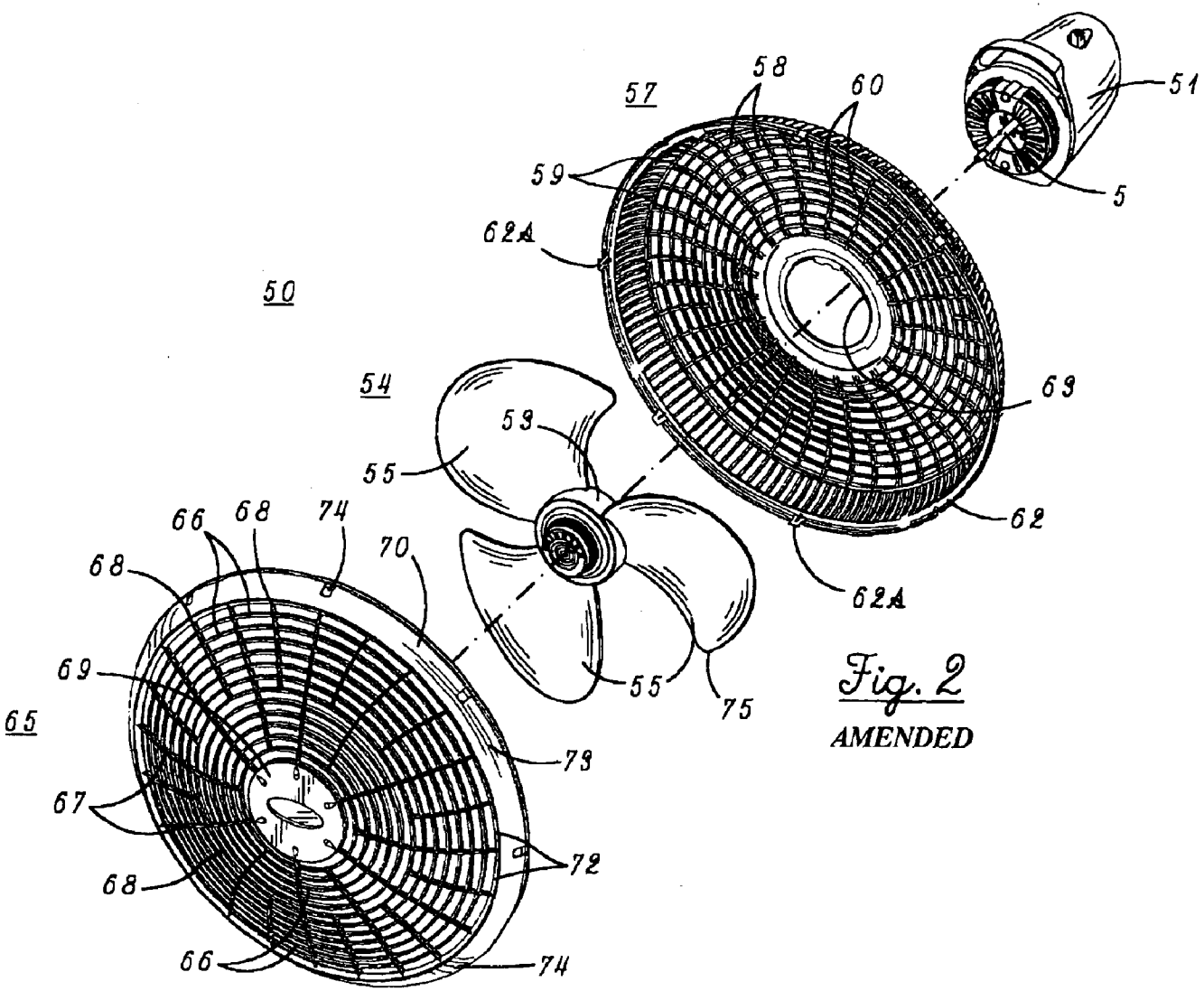
Fig. 2
AMENDED

50
A
D
51
55
75
59
70 B
71
C
90
69
55
59
73
71
72
AIR FLOW
AIR FLOW

FAN GRILL CONSTRUCTION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an improved fan grill guard construction of the type where the grill has an outer ring, which is dimensionally structured to provide greater airflow and diffusion.

2. Description of the Prior Art

The typical grill used on the front of oscillating, pedestal or wall mount fans is of round wire, with some fans such as shown in U.S. Pat. No. 6,071,079 having a front grill of molded plastic. There are many advantages in using molded plastic grills, in that plastic does not rust, is inexpensive to mold and does not require welding or painting. In addition, plastic permits easy design variation to achieve a look that is less restrictive in the center, and allows the customer to see the blades.

Plastic grills can also be constructed so they do not require additional parts such as rings or clips for assembly.

While the prior art, U.S. Pat. No. 6,071,079, uses plastic grills, it is designed to provide a focused air pattern, which is not entirely satisfactory if used in an oscillating fan, as it results in an on-off air flow, which is not as desirable as a diffused air flow, which is obtained by the grill construction described herein.

SUMMARY OF THE INVENTION

It has now been found that an improved fan grill construction can be obtained for a front grill, which has an outer ring which is dimensionally structured so that the air flow is diffused instead of focused, resulting in an improved total air volume (NEMA CFM) over a larger area.

The principal object of the invention is to provide front grill construction for a fan that is dimensionally structured to provide increased air volume over a large area.

A further object of the invention is to provide fan grill construction that allows tighter spacing to the fan blade periphery to provide a more efficient package with improved safety.

A further object of the invention is to provide fan grill construction which adds mass to the outside of the grill to dampen vibration.

A further object of the invention is to provide a front grill which is constructed for molded plastic.

A further object of the invention is to provide a fan grill construction that can be adapted to a variety of types and sizes of fans.

A further object of the invention is to provide fan grill construction where the grill is not part of the support for the motor/blade assembly.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 2 is an exploded perspective view of a fan with the new front grill construction of the invention;

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result. dimension C is the width of ring 70. The dimension D is the diameter of the blade assembly 54.

Figure 1:
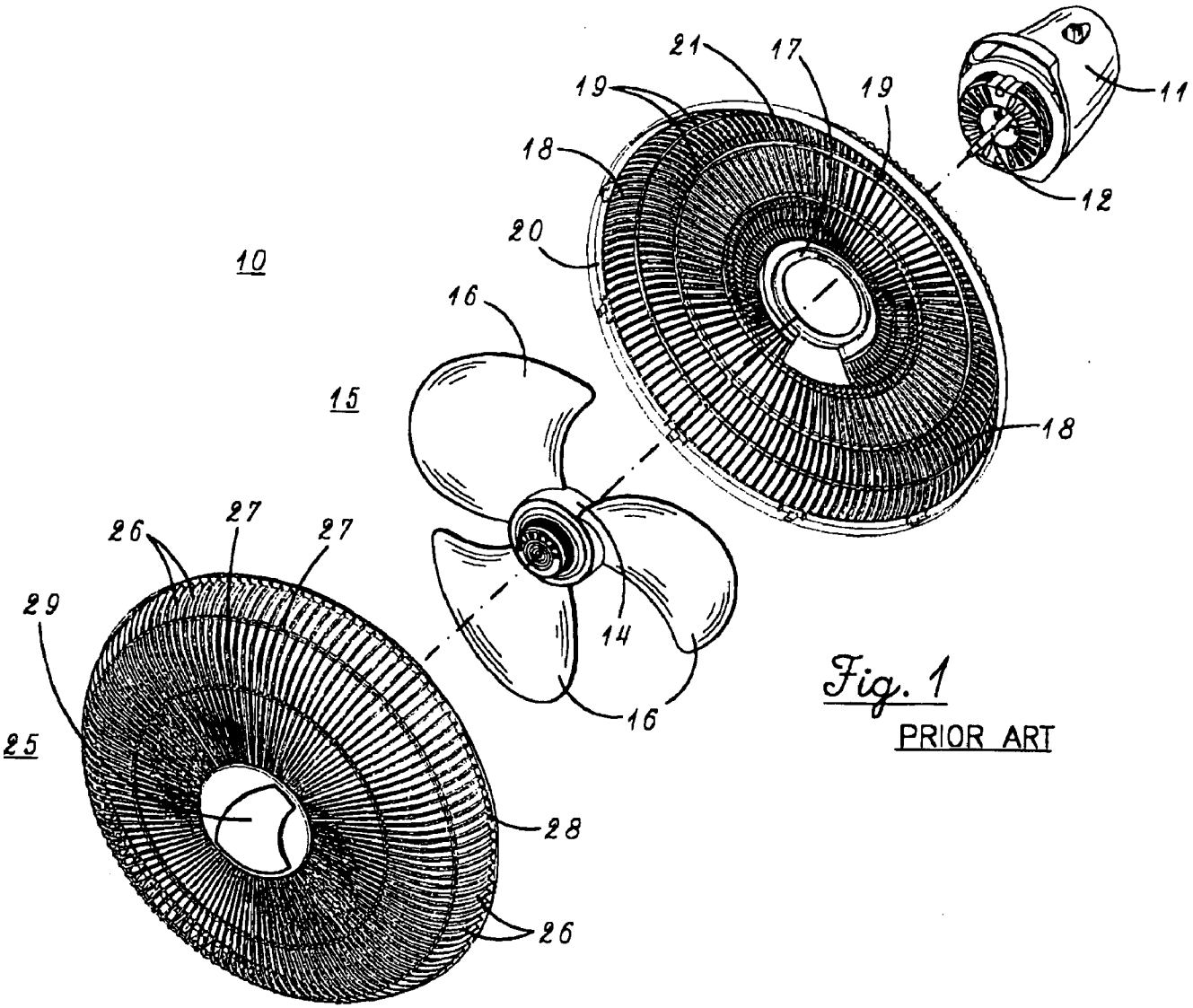
Fig. 1 PRIOR ART
FIG. 1 is an exploded perspective view of a prior art fan.
Figure 3:
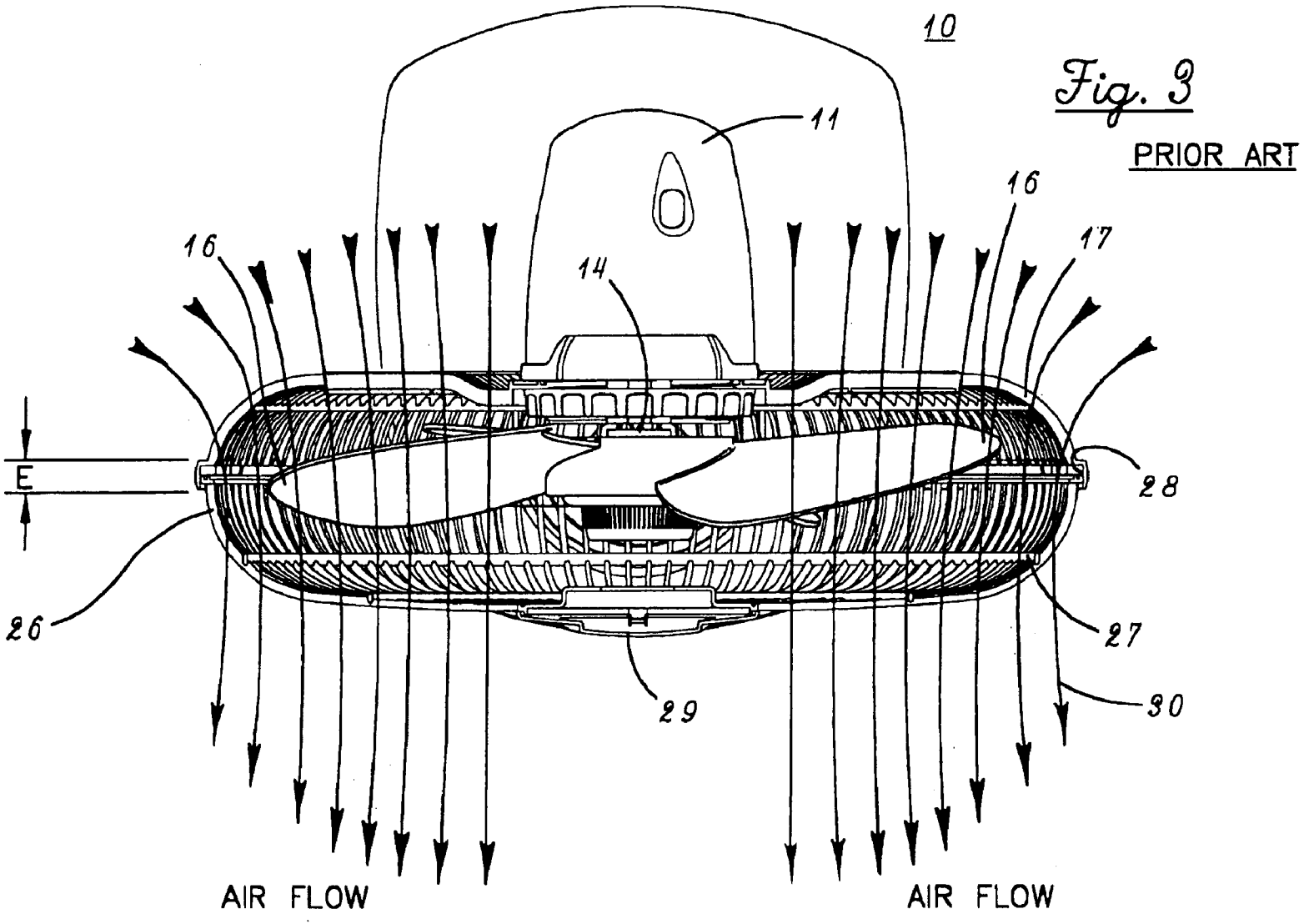
Fig. 3 PRIOR ART
FIG. 3 is a horizontal sectional view of the assembled prior art fan of FIG. 1.

Referring now more particularly to FIGS. 1 and 3 of the drawings, a typical prior art fan 10 is illustrated. The fan 10 includes an electric motor housing 11, which contains an electric motor (not shown) of well known type, which may be connected to a source of electrical power (not shown). The fan motor has an output shaft 12 with a hub 14 of blade assembly 15 attached thereto, with three blades 16 being shown.

The fan motor housing 11 may be mounted to a yoke (not shown) which may be mounted to a pedestal (not shown) or other well known support structure, which can rest on the floor, on a table or otherwhere as desired. The housing 11 has a rear grill 17 mounted thereto, which is of circular configuration, with a plurality of spaced radial ribs 18, connected to a plurality of concentric rings 19, with the radial ribs 18 extending out to a circumferential rim 20 and inwardly to a center ring 21. A front grill 25 is provided, which has a plurality of spaced radial ribs 26, which are connected to a plurality of concentric rings 27. The ribs 26 extend out to an outer rim 28, which mates with rim 20 of rear grill 17.

The radial ribs 26 also extend inwardly and are connected to a center plate 29.

Both the front and rear grills 25 and 17 are preferably formed of molded plastic.

As shown in FIG. 3, the arrows 30 illustrate the airflow through the rear grill 17, and out the front grill 25 in a focused pattern, which upon oscillation provides the on-off airflow that is not desirable.

Figure 4:
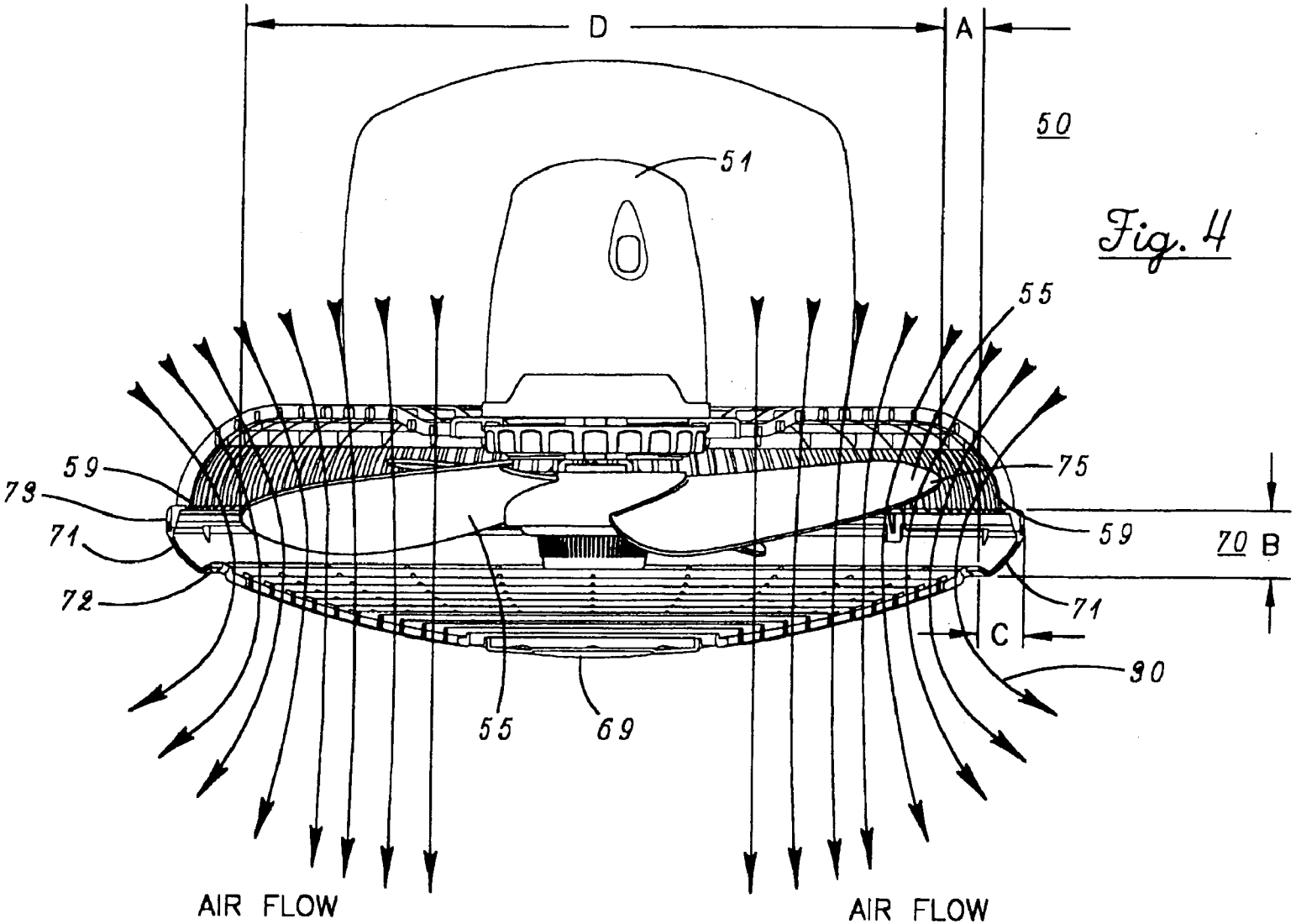
FIG. 4 is a view similar to FIG. 3 but showing the improved fan grill construction of the invention.

Referring now more particularly to FIGS. 2 and 4, the improved front grill construction is therein illustrated and as part of a fan 50.

The fan 50 includes an electric motor housing 51, which contains an electric motor (not shown) of well known type which may be connected to a source of electrical energy (not shown). The fan motor has an output shaft 52, to which a hub 53 of a blade assembly 54 is attached, with the blade assembly having three blades 55.

The fan motor housing 51 may be mounted to a pedestal (not shown) or other structure as described for fan 10.

The motor housing 51 has a rear grill 57 mounted thereto in conventional manner such as by bolts (not shown).

The rear grill 57 has a plurality of concentric rings 58 to which spaced interrupted radial ribs 59 and 60 are connected. The ribs 59 are shorter than ribs 60 and extend out to a rim 62 of grill 57. The ribs 60 extend out to rim 62 and inwardly to a center ring 63 which is attached to motor housing 51.

A front grill 65 is provided, of circular configuration, with a plurality of concentric rings 66, which have a plurality of spaced radial ribs 67 and 68 connected thereto, with ribs 67 extending inwardly to a center plate 69, and outwardly to a ring 70 to be described.

The ribs 68 extend outwardly to ring 70, and inwardly short of plate 69.

The ring 70 includes a curved panel 71, which extends inwardly to an inclined panel 72, and outwardly to a rim 73. The rim 73 mates with rim 62 of grill 57 with spaced tabs 62 A therearound, which are engaged with slots 74 in rim 73 to retain the grills 57 and 65 together.

In FIG. 4, the ring dimensions are indicated by the letters A, B, C and D. The dimension A is the distance from the tip 75 of a blade 55 to the inside diameter of the ring 70. The dimension B is the depth of ring 70, or the distance from the rear most portion of rim 73 to the front end of panel 71. The The dimensions A, B, C and D for the fan 50 in the preferred embodiment for a 16 inch fan with blade diameter D=16 inches, are A=0.170 inches, B=1.41 inches and C=0.95 inches.

The dimensions A, B, and C for oscillating fans with a typical blade diameter from 6 to 30 inches, with D as an initial dimensional base point, have the dimensions calculated as follows where the range of A is +/−40% of D as measured from tip 75, B=0.60 to 4.5 inch, and C=40 to 200% B.

It has been found by testing that a 16 inch fan 50 with a front grill 65, compared to a prior art 16 inch fan 10 with front grill 25, provides significant improvement.

The fan 50 on high speed at 9 feet from the fan provided an air velocity (NEMA CFM) of 5710.00, whereas fan 10 provided an air velocity (NEMA CFM) of 4737. 10.

Figure 5:
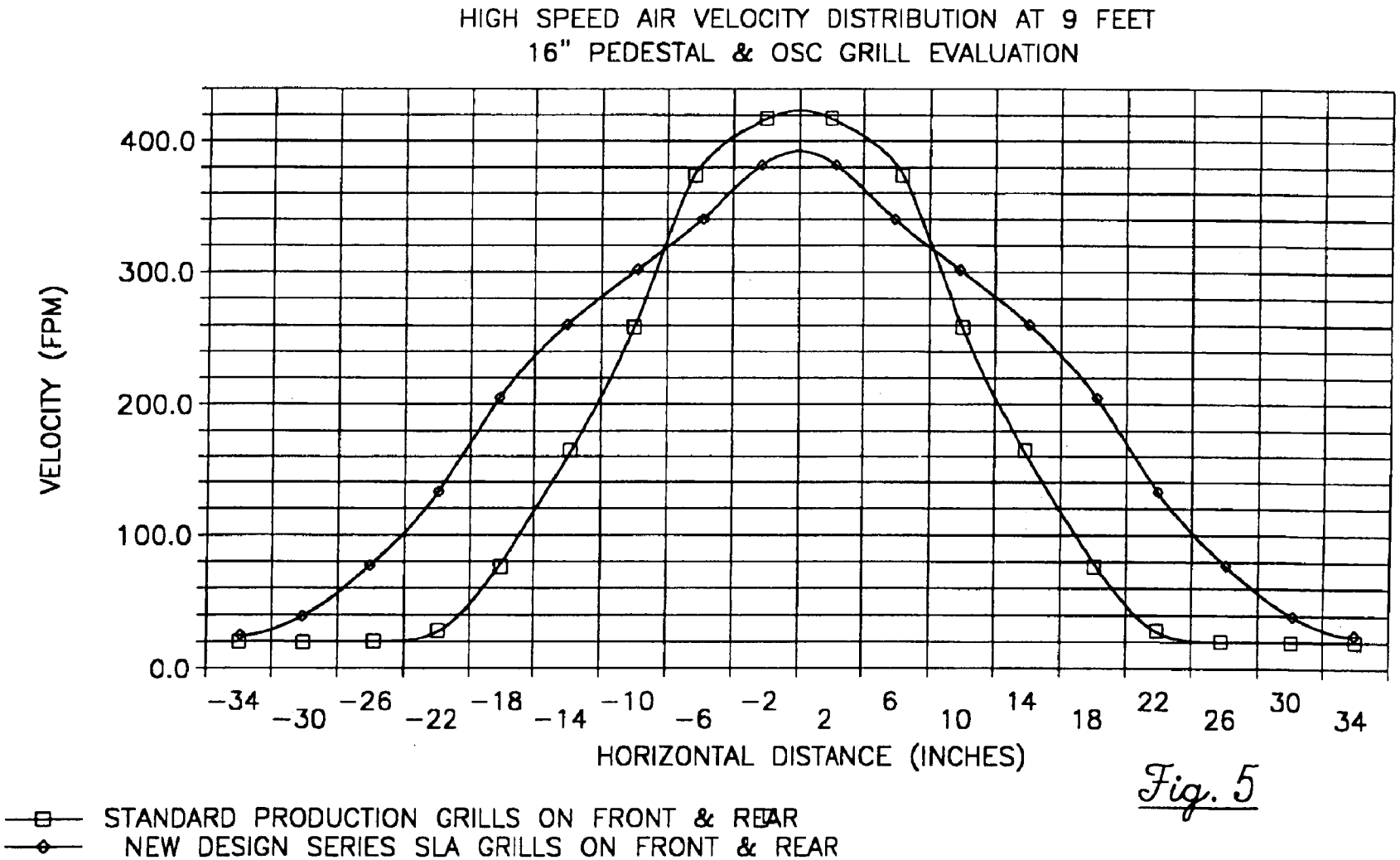
FIG. 5 is a graph comparing the performances of the prior art fan grill construction to the improved fan grill construction of the invention.

Referring to FIG. 5 tests were run on two fans comparing the fans 10 and 50 with measurements at horizontal distances to 34 inches on each side. The results were plotted in in FIG. 6 which shows significantly greater air velocities over the distance for fan 50 with the improved front grill construction.

It will thus be seen that an improved fan grill construction has been provided with which the objects of the invention are achieved.

We claim:

1. In combination with a fan, which fan has a fan motor, a fan blade assembly attached to and driven by said fan motor, a motor housing containing said motor, a rear grill to which said motor housing is mounted, and a front grill attached to said rear grill, the improvement which comprises, a plurality of spaced radial ribs, said front grill having a center plate to which some of said radial ribs are connected, at least a portion of said radial ribs extending outwardly to a circumferential ring, said circumferential ring having a curved panel extending to a rim and an inclined panel [to which said ribs are connected], *said ribs connected to said inclined panel,* said circumferential ring having dimensions based on a fan blade diameter D, with a dimension A of said ring being a distance from a tip of said fan blade assembly to an inside diameter of said ring, a dimension B being a depth of said ring, and a dimension C being a width of said ring, said dimension A being up to about 40% of said fan blade diameter D, said dimension B being between about 0.60 to 4.5 inches and said dimension C is between about 40 to 200% of said dimension B, and wherein said front grill provides a diffuse airflow from said fan.

2. A fan as defined in claim 1 in which D is 16 inches, A is 0.170 inches, B is 1.41 inches and C is 0.95 inches.

3. A fan as defined in claim 1 in which said front grill is of molded plastic.

4. A fan according to claim 1, wherein said front grill provides an increased air volume over a predetermined area.

5. A fan according to claim 4, wherein said fan is an oscillating fan.

6. A fan according to claim 5, wherein said motor housing is external to said rear grill.

7. A fan according to claim 1, wherein said front grill dampens vibrations of said fan based on a mass of said front grill.

[8. A fan according to claim 1, wherein an inside edge of said circumferential ring overlays a portion of said fan blade by said dimension A.]

9. [A] *The* fan according to claim 1, wherein an inside edge of said circumferential ring establishes a clearance from said fan blade tip by said dimension A.

[10. A front grill for use with an oscillating fan having a fan blade assembly, said front grill comprising:

a circumferential ring at an outer periphery of said front grill, said circumferential ring having an inside edge spaced away from a tip of said fan blade assembly by a predetermined distance based on a diameter of said fan blade assembly, said front grill providing a diffuse air pattern.]

[11. The grill according to claim 10, wherein said predetermined distance is less than about 40% of a diameter of said fan blade assembly, and said circumferential ring further comprising:

i) a depth, and ii) a width, wherein said depth is between about 0.60 and 4.50 inches, and said width is between about 40% to 200% of said depth.]

[12. A grill for use with a fan having a motor and a fan blade assembly, said grill comprising:

a circumferential ring at an outer periphery of said grill, said circumferential ring having:

i) an inside edge spaced away from a tip of said fan blade assembly by a predetermined distance, where said predetermined distance is less than about 40% of a diameter of said fan blade assembly, ii) a depth, and iii) a width, wherein said depth is between about 0.60 and 4.50 inches, said width is between about 40% to 200% of said depth, and said inside edge of said circumferential ring overlays a portion of said fan blade assembly by said predetermined distance and wherein said grill provides a diffuse airflow from said fan.]

[13. A grill according to claim 12, wherein said grill provides an increased air volume over a predetermined area.]

[14. A grill according to claim 12, wherein said fan is an oscillating fan.]

[15. A grill according to claim 12, wherein said fan is a table mounted fan.]

[16. A grill according to claim 12, wherein said fan is a floor mounted fan.]

[17. A grill according to claim 12, wherein said grill dampens vibrations of said fan based on a mass of said grill.]

[18. A grill according to claim 12, further comprising a plurality of attaching means for coupling said grill to a portion of said fan.]

[19. A grill according to claim 18, wherein said attaching means is a plurality of slots formed in said circumferential ring.]

[20. A grill according to claim 12, wherein said grill is mounted on a front portion of said fan such that air circulated by said fan blade exits through said grill.]

[21. A grill according to claim 12, wherein said grill is a plurality of grills, a first one of said plurality of grills mounted on said fan motor on a front portion thereof, such that air circulated by said fan blade enters through said first grill, and a second one of said plurality of grills mounted on a front portion of said first grill such that air circulated by said fan blade exits through said second grill.]

[22. A grill according to claim 12, further comprising a rear grill coupled to said grill and wherein said motor is mounted external to said rear grill.]

[23. An oscillating fan having a rear grill, a front grill attached to said rear grill, a fan motor external to said rear grill, to which said rear grill is mounted, a fan blade assembly attached to and driven by said fan motor, said front grill comprising:

a circumferential ring at an outer periphery of said front grill, said circumferential ring having dimensions based on the fan blade assembly having a diameter of about 16 inches:

i) an inside edge spaced away from a tip of said fan blade assembly by about 0.170 inches, establishing a clearance between said fan blade assembly tip and said inside edge of said circumferential ring, ii) a depth of about 1.41 inches, and iii) a width of about 0.95 inches, wherein said front grill provides a diffuse airflow from said fan.]

[24. A grill according to claim 23, wherein said fan is a table mounted fan.]

[25. A grill according to claim 23, wherein said fan is a floor mounted fan.]

[26. A grill for use with a fan having a motor and a fan blade assembly, said grill comprising:

a circumferential ring at an outer periphery of said grill, said circumferential ring having:

i) an inside edge spaced away from a tip of said fan blade assembly by a predetermined distance, where said predetermined distance is less than about 40% of a diameter of said fan blade assembly, ii) a depth, and iii) a width, wherein said depth is between about 0.60 and 4.50 inches, said width is between about 40% to 200% of said depth, and said inside edge of said circumferential ring one of i) overlays a portion of said fan blade assembly by said predetermined distance and ii) establishes a clearance from said fan blade assembly tip by said predetermined distance and wherein said grill provides a diffuse airflow from said fan.]

[27. A grill according to claim 26, wherein said grill provides an increased air volume over a predetermined area.]

[28. A grill according to claim 26, wherein said fan is an oscillating fan.]

[29. A grill according to claim 26, wherein said fan is a table mounted fan.]

[30. A grill according to claim 26, wherein said fan is a floor mounted fan.]

[31. A grill according to claim 26, wherein said grill dampens vibrations of said fan based on a mass of said grill.]

[32. A grill according to claim 26, further comprising a plurality of attaching means for coupling said grill to a portion of said fan.]

[33. A grill according to claim 32, wherein said attaching means is a plurality of slots formed in said circumferential ring.]

[34. A grill according to claim 26, wherein said grill is mounted on a front portion of said fan such that air circulated by said fan blade exits through said grill.]

[35. A grill according to claim 26, wherein said grill is a plurality of grills, a first one of said plurality of grills mounted on said fan motor on a front portion thereof, such that air circulated by said fan blade enters through said first grill, and a second one of said plurality of grills mounted on a front portion of said first grill such that air circulated by said fan blade exits through said second grill.]

[36. A grill according to claim 26, further comprising a rear grill coupled to said grill and wherein said motor is mounted external to said rear grill.]

*37. A fan comprising:*

*a fan blade assembly having a diameter D;*

*a motor assembly used to rotate said fan blade assembly, said motor assembly comprising:*

*an electric motor; and*

*a motor housing substantially enclosing said electric motor;*

*a grill assembly comprising:*

*a unitary front grill formed of a polymer, said unitary front grill comprising:*

*a front center portion;*

*an integral front circumferential ring formed of a polymer, said front circumferential ring further comprising:*

*a dimension B being an axial thickness of said integral front circumferential ring,*

*a dimension C being a width of said integral front circumferential ring measured radially from an inside edge portion of said integral front circumferential ring to an outer periphery portion of said integral front circumferential ring, and*

*a plurality of front grill elements disposed between said front center portion and said front circumferential ring; and*

*a rear grill coupled between said motor assembly and said unitary front grill, said rear grill comprising:*

*a rear center portion defining an aperture for receiving at least a portion of said motor assembly, said rear grill being detachably coupled to said motor assembly and a substantial portion of said motor assembly remains external of said rear grill when said portion of said motor assembly is received by said aperture;*

*an outer rim, and*

*a plurality of rear grill elements disposed between said rear center portion and said outer rim,*

*wherein a dimension A is a distance from a tip of said fan blade assembly to said inside edge portion of said integral front circumferential ring, and*

*said dimension A is up to about 40% of said diameter D, said dimension B is between about 0.6 inches and about 4.5 inches, and said dimension C is between about 0.24 inches and about 9 inches; and*

*wherein said front grill provides a diffuse airflow from said fan.*

*38. The fan of claim 37 wherein said outer rim of said rear grill is a rear circumferential ring, and an axial thickness of said rear circumferential ring combined with said dimension B defines a combined axial thickness of said grill assembly.*

*39. The fan of claim 38 wherein said combined axial thickness is between about 1 inch and about 4.5 inches.*

*40. The fan of claim 38 wherein said combined axial thickness is between about 1.4 inches and about 4.5 inches.*

*41. A fan comprising:*

*a fan blade assembly having a diameter D;*

*a motor assembly used to rotate said fan blade assembly, said motor assembly having an electric motor and a motor housing substantially enclosing said electric motor;*

*a grill assembly comprising:*

*a unitary front grill formed of a polymer, said unitary front grill comprising:*

*a front center portion;*

*a front circumferential ring formed integral with said front grill; and*

*a plurality of front grill elements disposed between said front center portion and said integral front circumferential ring, where openings are defined between said front grill elements allowing air to pass therethrough,*

*a dimension A being a distance from a tip of said fan blade assembly to an inside edge portion of said integral front circumferential ring,*

*a dimension B being an axial thickness of said integral front circumferential ring,*

*a dimension C being a width of said integral front circumferential ring measured radially outward from a furthest radial extent of said front grill elements to an outer periphery of said integral front circumferential ring, and*

*said dimension A being up to about 40% of said diameter D, and said dimension C being between about 0.24 inches and about 9 inches,*

*wherein said front grill provides a diffuse airflow from said fan,*

*a rear grill adapted to be coupled to said unitary front grill, said rear grill comprising:*

*a rear center portion defining an aperture for receiving a portion of said motor assembly, said rear grill being detachably coupled to said motor assembly and a substantial portion of said motor assembly remains external of said grill assembly when said portion of said motor assembly is received by said aperture,*

*an outer rim, and*

*a plurality of rear grill elements disposed between said rear center portion and said outer rim, where openings are defined between said rear grill elements allowing air to pass therethrough.*

*42. The fan of claim 41 wherein said dimension B is between about 0.6 inches and about 4.5 inches.*

*43. The fan according to claim 37 or 41 wherein said inside edge portion of said integral front circumferential ring either (i) overlays a portion of said diameter D of said fan blade assembly by said dimension A; or (ii) establishes a radial clearance from said tip of said fan blade assembly by said dimension A.*

*44. The fan according to claim 37 or 41 wherein a mass of said integral front circumferential ring dampens vibration of said fan.*

*45. The fan according to claim 37 or 41 wherein said front grill elements further comprise a plurality of radial ribs, one or more of said radial ribs extending from said integral front circumferential ring to said front center portion.*

*46. The fan of claim 45 wherein one or more of said radial ribs extend from said integral front circumferential ring towards, but short of, said front center portion.*

*47. The fan of claim 37 or 41 wherein said rear grill is formed of a polymer and said rear grill elements comprise a plurality of radial ribs, one or more of said radial ribs extending from said outer rim to said rear center portion.*

*48. The fan of claim 47 wherein one or more of said radial ribs extend from said outer rim towards, but short of, said rear center portion.*

*49. A fan comprising:*

*a fan blade assembly having a diameter D;*

*a motor assembly used to rotate said fan blade assembly generating an axial air flow in a forward direction, said motor assembly comprising:*

*an electric motor; and*

*a motor housing substantially enclosing said electric motor; and*

*a grill assembly comprising:*

*a rear grill comprising a rear center portion, a rear outer periphery, and a plurality of rear grill elements disposed between said rear center portion and said rear outer periphery, said rear center portion defining an aperture for receiving a portion of said motor assembly, said rear grill being detachably coupled to said motor assembly such that a substantially portion of said motor assembly remains external of said grill assembly when said portion of said motor assembly is received by said aperture;*

*a unitary front grill formed of a polymer, said front grill being detachably coupled to said rear grill, said unitary front grill comprising a front center portion, an integral front outer periphery, and a plurality of front grill elements disposed between said front center portion and said front outer periphery;*

*a circumferential ring disposed between said front grill and said rear grill, at least a portion of said circumferential ring being unitary and integral to said front grill and/or both said front grill and said rear grill,*

*said portion of said unitary and integral circumferential ring corresponding to said front grill being at least partially located axially forward of said rear grill,*

*wherein said unitary and integral circumferential ring defines a dimension A being a distance from a tip of said fan blade assembly to a forward inside edge portion of said unitary and integral circumferential ring, a dimension B being an axial thickness of said unitary and integral circumferential ring measured from a forward edge to a rear edge of said unitary and integral circumferential ring, and a dimension C being a width of said unitary and integral circum-*

*ferential ring measured radially from said forward inside edge portion of said unitary and integral circumferential ring to an outer periphery portion of said unitary and integral circumferential ring,*

*wherein said dimension A is up to about 40% of said diameter D of said fan blade assembly, and*

*wherein said front grill provides a diffuse airflow from said fan.*

*50. The fan of claim 49 wherein said dimension C is between about 0.24 inches and about 9 inches.*

*51. The fan of claim 49 wherein said dimension B is between about 0.6 inches and about 4.5 inches.*

*52. The fan according to claim 49 wherein said front grill elements further comprise a plurality of radial ribs, one or more of said radial ribs extending from said unitary and integral circumferential ring to said front center portion.*

*53. The fan of claim 52 wherein one or more of said radial ribs extend from said unitary and integral circumferential ring towards, but short of, said front center portion.*

*54. The fan of claim 49 wherein said rear grill is formed of a polymer and said rear grill elements comprise a plurality of radial ribs, one or more of said radial ribs extending from one of said rear outer periphery and said unitary and integral circumferential ring to said rear center portion.*

*55. The fan of claim 49 wherein one or more of said radial ribs extend from one of said rear outer periphery and said unitary and integral circumferential ring towards, but short of, said rear center portion.*

*56. The fan of claim 49 wherein said unitary and integral circumferential ring further defines a sectional profile taken along a radial plane from a center of said unitary and integral circumferential ring, said sectional profile defining a first circumferential panel having at least one of a straight sectional profile or a curved sectional profile.*

*57. The fan of claim 56 wherein said sectional profile further defines a second circumferential panel extending from a forward edge of an inner circumferential portion of said first circumferential panel, said second circumferential panel extending inwardly towards said front center portion of said unitary front grill, said second circumferential panel having at least one of a straight sectional profile or a curved sectional profile.*

*58. The fan of claim 49, wherein said forward inside edge portion of said unitary and integral circumferential ring either (i) overlays a portion of diameter D of said fan blade assembly by said dimension A, or (ii) establishes a radial clearance from said tip of said fan blade assembly by said dimension A.*

*59. The fan according to claim 49 wherein a mass of said unitary and integral circumferential ring dampens vibration of said fan.*

*60. The fan according to claim 37, 41, or 49 wherein said dimension B is between about 1 inch and about 4.5 inches.*

*61. The fan according to claim 37, 41, or 49 wherein said dimension B is between about 1.4 inches and about 4.5 inches.*

*62. The fan according to claim 37, 41, or 49 wherein said dimension D of said blade assembly is greater than about 12 inches.*

*63. The fan according to claim 37, 41, or 49 wherein said dimension D of said blade assembly is greater than about 16 inches.*

*64. The fan according to claim 37, 41, or 49 wherein said front grill provides diffuse air flow from said fan.*

*65. The fan according to claim 37, 41, or 49 wherein said fan is an oscillating fan.*

*66. The fan of claim 65 further comprising a pedestal, said pedestal being used to elevate and support said fan in an upright position with reference to a support surface.*

*67. The fan according to claim 37, 41, or 49 wherein said front grill and said rear grill are detachably coupled to one another.*

*68. The fan of claim 67 wherein said front grill and said rear grill may be manually assembled and disassembled to/from one another without tools.*

*69. The fan of claim 67 wherein at least one of said front grill or said rear grill may be at least partially nested within the other of said front grill or said rear grill when said front grill and said rear grill are disassembled from one another, thereby facilitating efficient packaging.*

*70. The fan of claim 67 further comprising a connecting mechanism disposed between and connecting said front grill and said rear grill.*

*71. The fan of claim 70 wherein said connecting mechanism comprises a plurality of tab portions extending between said rear grill and said front grill, said plurality of tab portions being integral with, or coupled to, one of said rear grill and said front grill.*

*72. The fan of claim 71 wherein said connecting mechanism further comprises a plurality of slots defined by the other of said front grill and said rear grill, said slots corresponding in number and location to said plurality of tab portions, said slots being configured to receive said tab portions.*

*73. The fan according to claim 37, 41, or 49 wherein said motor assembly is detachably coupled to said rear grill through engagement of a male threaded component with a female threaded component.*

*74. The fan according to claim 37, 41, or 49 wherein said rear grill is separate and distinct from said motor housing.*

*75. The fan according to claim 37, 41, or 49 wherein said grill assembly is structurally supported by said motor assembly.*

*76. The fan according to claim 37, 41, or 49 wherein said motor housing substantially encloses all sides and ends of said electric motor.*

*77. The fan according to claim 37, 41, or 49 wherein said motor assembly is separate and distinct from said rear grill.*

*78. The fan of claim 77 wherein said motor assembly is detachable from said rear grill, thereby facilitating efficient packaging.*

*79. The fan according to claim 37, 41, or 49 wherein said front grill elements further comprise a plurality of substantially concentric rings.*

*80. The fan according to claim 37, 41, or 49 wherein said rear grill is formed of a polymer.*

*81. The fan of claim 80 wherein said rear grill elements further comprise a plurality of substantially concentric rings.*

*82. The fan according to claim 1, wherein an inside edge of said circumferential ring overlays a portion of said fan blade by said dimension A.*

* * * * *